United States Patent
Takada

(10) Patent No.: US 10,700,715 B2
(45) Date of Patent: Jun. 30, 2020

(54) RADIO-FREQUENCY CIRCUIT

(71) Applicant: Murata Manufacturing Co., Ltd., Nagaokakyo-shi, Kyoto-fu (JP)

(72) Inventor: Atsushi Takada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/375,866

(22) Filed: Apr. 5, 2019

(65) Prior Publication Data
US 2019/0356344 A1 Nov. 21, 2019

(30) Foreign Application Priority Data
May 21, 2018 (JP) .................. 2018-097349

(51) Int. Cl.
*H04B 1/00* (2006.01)
*H04B 1/48* (2006.01)

(52) U.S. Cl.
CPC ............. *H04B 1/0057* (2013.01); *H04B 1/48* (2013.01); *H04B 2001/485* (2013.01)

(58) Field of Classification Search
CPC .. H04B 1/0057; H04B 1/48; H04B 2001/485; H04B 1/0064
See application file for complete search history.

(56) References Cited

U.S. PATENT DOCUMENTS

| 2018/0019768 A1 | 1/2018 | King et al. |
| 2018/0076770 A1 | 3/2018 | Arfaei Malekzadeh et al. |
| 2018/0109243 A1 | 4/2018 | Takamine |

FOREIGN PATENT DOCUMENTS

WO 2016/208670 A1 12/2016

*Primary Examiner* — Devan A Sandiford
(74) *Attorney, Agent, or Firm* — Keating & Bennett, LLP

(57) ABSTRACT

First and second frequency bands used for multiband communication are both higher than or equal to about 3 GHz, and do not overlap each other. The spacing between the first and second frequency bands is less than or equal to about 10% of the lower one of the lower-bound frequency of the first frequency band and the lower-bound frequency of the second frequency band. A radio-frequency circuit includes a first antenna, a second antenna, a first multiplexer connected to the first antenna, and a second multiplexer connected to the second antenna. The first multiplexer includes a first filter with a pass band including the first frequency band, and a third filter with a pass band different from the first filter. The second multiplexer includes a second filter with a pass band including the second frequency band, and a fourth filter with a pass band that differs from the second filter.

17 Claims, 3 Drawing Sheets

| SYMBOL | FREQUENCY RANGE [MHz] | SPECIFIC EXAMPLES OF COMMUNICATION BANDS |
|---|---|---|
| L | 617-960 | GSM* LOW BANDS, LTE B8/12/13/14/20/26/28/29, ETC. |
| MH | 1427-2690 | GSM* HIGH BANDS, LTE B1/3/7/30/32/39/40/41/66, ETC. |
| UH1 | 3300-4200 | NR n77/78 |
| UH2 | 4400-4990 | NR n79 |
| WL2 | 2400-2500 | WLAN 2.4GHz, Bluetooth* |
| WL5 | 5150-5950 | WLAN 5GHz, LTE B46 |
| L1 | 1559-1606 | GPS L1, GLONASS L1 |
| L5 | 1166-1229 | GPS L5 |

*GSM AND Bluetooth ARE REGISTERED TRADEMARKS

RADIO-FREQUENCY CIRCUIT

CROSS REFERENCE TO RELATED APPLICATIONS

This application claims the benefit of priority to Japanese Patent Application No. 2018-097349 filed on May 21, 2018. The entire contents of this application are hereby incorporated herein by reference.

BACKGROUND OF THE INVENTION

1. Field of the Invention

The present invention relates to a radio-frequency circuit that processes a radio-frequency signal.

2. Description of the Related Art

Radio-frequency circuits used for communication using a plurality of frequency bands (multiband) and a plurality of radio systems (multimode) (to be abbreviated as multiband communication hereinafter) are known in the related art (see, for example, International Publication No. 2016/208670).

International Publication No. 2016/208670 discloses a multiplexer that is connected to an antenna, and includes a plurality of acoustic wave filters having different pass bands.

Using the multiplexer disclosed in International Publication No. 2016/208670 allows an antenna signal to be isolated into different frequency bands for transmission and reception by a single antenna. Such antenna sharing reduces the number of antennas, thus allowing for miniaturization of mobile terminal apparatuses.

Recent years have seen development of communication systems that utilize increasingly higher frequency bands, and opening-up of the corresponding frequency bands. One example of such communication systems is 5th Generation New Radio (5G NR) being currently developed by the Third Generation Partnership Project (3GPP). For 5G NR (to be also referred to simply as NR hereinafter), it is expected that frequency bands at or above 3 GHz and below 6 GHz (so-called sub-6 GHz) will be available in the near future.

However, acoustic wave filters (including surface acoustic wave filters and bulk acoustic wave filters) capable of providing isolation between signals at or above 3 GHz have not been achieved with the current technology yet. For this reason, for NR sub-6 GHz, it is not possible to use multiplexers including acoustic wave filters. Furthermore, for NR sub-6 GHz, if the spacing between a plurality of frequency bands for which isolation needs to be provided is narrow, it is also difficult to achieve signal isolation using an LC filter, which exhibits less steep characteristics than an acoustic wave filter. Thus, for NR sub-6 GHz, an antenna is required for each corresponding frequency band. This requirement, together with the number of antennas through which signals in existing frequency bands lower than or equal to 3 GHz pass, leads to an increase in the number of antennas, and also degradation of isolation between signals transmitted in a plurality of frequency bands.

SUMMARY OF THE INVENTION

Preferred embodiments of the present invention provide radio-frequency circuits that are each for multiband communication in a plurality of frequency bands higher than or equal to about 3 GHz, and make it possible to reduce or minimize an increase in the number of antennas while providing isolation between signals transmitted in a plurality of frequency bands.

A radio-frequency circuit according to a preferred embodiments of the present invention is capable of performing multiband wireless communication in a plurality of frequency bands, the plurality of frequency bands including a first frequency band and a second frequency band, both of the first frequency band and the second frequency band being higher than or equal to about 3 GHz and non-overlapping with each other, the first frequency band and the second frequency band having a spacing from each other less than or equal to about 10% of the lower one of the lower-bound frequency of the first frequency band and the lower-bound frequency of the second frequency band. The radio-frequency circuit includes a first antenna, a second antenna, a first multiplexer connected to the first antenna, and a second multiplexer connected to the second antenna. The first multiplexer includes a first filter having a pass band that includes the first frequency band, and a third filter having a pass band different from the pass band of the first filter. The second multiplexer includes a second filter having a pass band that includes the second frequency band, and a fourth filter having a pass band different from the pass band of the second filter.

With a radio-frequency circuit according to a preferred embodiment of the present invention, both of the first frequency band and the second frequency band are higher than or equal to about 3 GHz. Therefore, it is not possible to isolate a signal in the first frequency band and a signal in the second frequency band from each other using an acoustic wave filter. Further, the first frequency band and the second frequency band have a narrow spacing from each other that is less than or equal to about 10% of the lower one of the lower-bound frequency of the first frequency band and the lower-bound frequency of the second frequency band. This also makes it difficult to isolate a signal in the first frequency band and a signal in the second frequency band from each other using an LC filter.

Accordingly, a radio-frequency circuit according to a preferred embodiment of the present invention includes the first antenna and the second antenna, and a signal in the first frequency band is transmitted and received by the first antenna and a signal in the second frequency band is transmitted and received by the second antenna. That is, isolation between a signal in the first frequency band and a signal in the second frequency band, which is difficult to achieve by an acoustic wave filter or by an LC filter, is achieved by using separate antennas for these signals.

Further, the first antenna is shared by the first frequency band and the third frequency band, and the second antenna is shared by the second frequency band and the fourth frequency band. That is, rather than combining the first and second frequency bands, each antenna is shared by a combination of different frequency bands into which a signal is able to be isolated by the corresponding multiplexer. This configuration reduces or minimizes an increase in the number of antennas resulting from an increase in the number of frequency bands.

Preferred embodiments of the present invention provide radio-frequency circuits that are each capable of performing multiband communication in a plurality of frequency bands higher than or equal to about 3 GHz, and makes it possible to reduce or minimize an increase in the number of antennas while providing isolation between signals transmitted in a plurality of frequency bands.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will be described below in detail with reference to preferred embodiments and the accompanying drawings. The preferred embodiments described below each represent generic or specific examples. Features included in the following preferred embodiments, such as numerical values, shapes, materials, components, and the placement and connection of components, are illustrative only and do not limit the present invention.

The following description of preferred embodiments of the present invention will be directed to radio-frequency circuits for multiband communication in a plurality of frequency bands higher than or equal to about 3 GHz, to reduce or minimize an increase in the number of antennas. The following describes exemplary radio-frequency circuits for multiband communication using a plurality of frequency bands in the NR sub-6 GHz range described above and a plurality of frequency bands in existing communication standards.

Figures 1, 2:
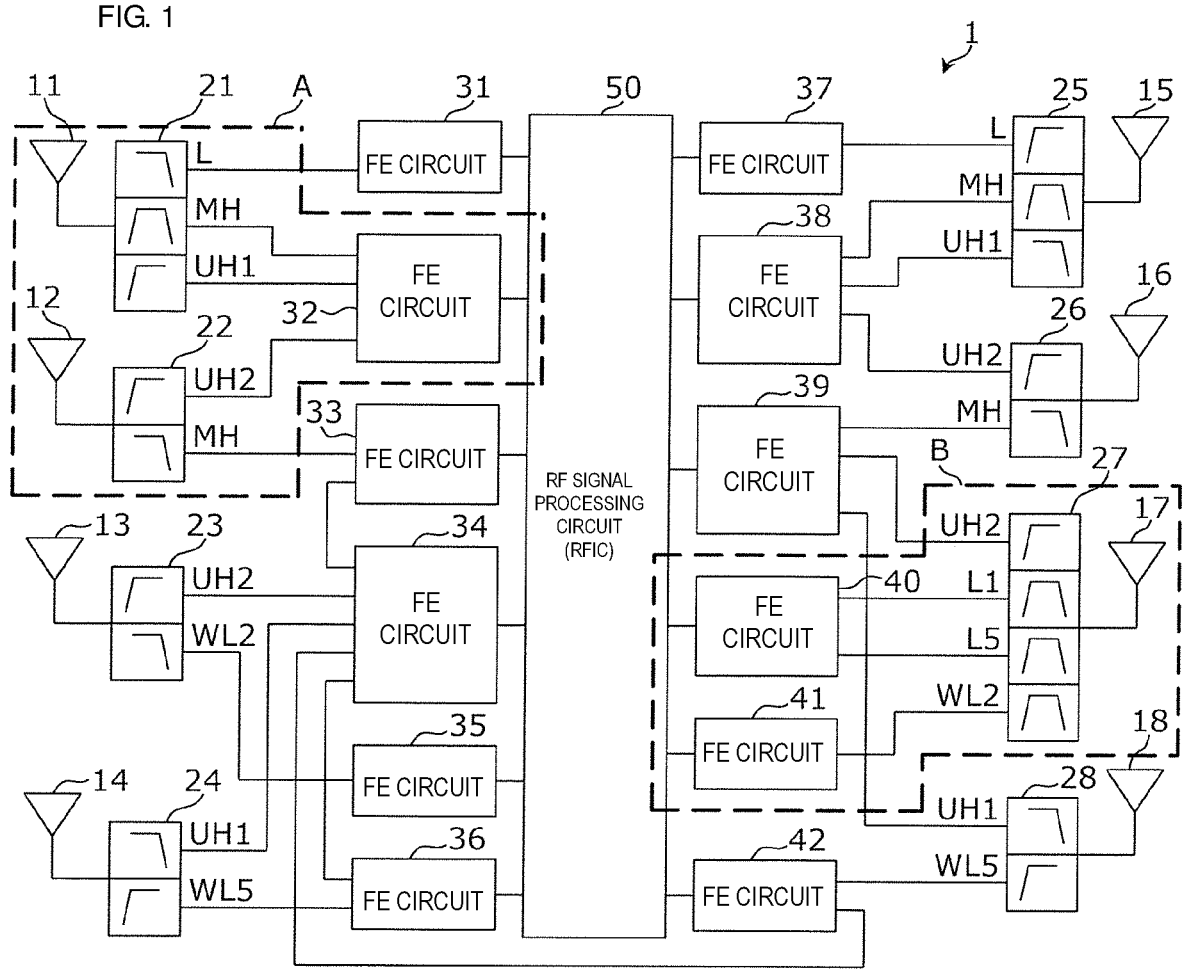
FIG. 1 is a functional block diagram illustrating an exemplary configuration of a radio-frequency circuit according to a preferred embodiment of the present invention.
FIG. 2 illustrates an example of frequency bands used in a radio-frequency circuit according to a preferred embodiment of the present invention.

FIG. 1 is a functional block diagram illustrating an exemplary configuration of a radio-frequency circuit according to a preferred embodiment of the present invention. As illustrated in FIG. 1, a radio-frequency circuit 1 includes antennas 11 to 18, multiplexers 21 to 28, front-end (FE) circuits 31 to 42, and an RF signal processing circuit 50.

The antennas 11 to 18 transmit and receive antenna signals.

The multiplexers 21 to 28 each include a plurality of filters with different pass bands. A symbol attached to each of the filters represents the frequency band included in the pass band of the filter. That is, each filter is a low pass filter, a bandpass filter, or a high pass filter whose pass band includes the corresponding frequency band. The filters are connected to each other at one end to be connected to the corresponding one of the antennas 11 to 18. The multiplexers 21 to 28 each isolate an antenna signal into signals in frequency bands corresponding to individual filters.

The FE circuits 31 to 42 are connected to the multiplexers 21 to 28. The FE circuits 31 to 42 perform a process including at least one of matching, amplification, and transmit-receive isolation to each of the antenna signals from the antennas 11 to 18 that are connected to the front-end (FE) circuits 31 to 42 via the multiplexers 21 to 28.

The RF signal processing circuit 50 is connected to the FE circuits 31 to 42. The RF signal processing circuit 50 applies a process including at least one of modulation and demodulation to each of the antenna signals from the antennas 11 to 18 that are connected to the RF signal processing circuit 50 via the FE circuits 31 to 42. The RF signal processing circuit 50 may preferably be defined by, for example, a radio-frequency integrated circuit (RFIC), and the radio-frequency integrated circuit may include a plurality of chips corresponding to different communication systems.

FIG. 2 illustrates an example of frequency bands used in the radio-frequency circuit 1. FIG. 2 illustrates, in association with the symbols attached to the filters illustrated in FIG. 1, the corresponding frequency ranges, and specific examples of communication bands included in the frequency ranges. For each filter illustrated in FIG. 1, the frequency band represented by the corresponding symbol is included in its pass band.

FIG. 2 lists, as specific examples of communication bands, the names of major frequency bands used in Global System for Mobile communications (GSM) (registered trademark), Long Term Evolution (LTE), NR, Wireless Local Area Network (WLAN), Bluetooth (registered trademark), Global Positioning System (GPS), and Global Navigation Satellite System (GLONASS).

The radio-frequency circuit 1 may process one or more of the communication bands listed in FIG. 2, or may process all of the communication bands. The radio-frequency circuit 1 may further process other communication bands not listed in FIG. 2.

The configuration of each FE circuit will be described below with reference to the FE circuits 32, 40, and 41 by way of example.

Figure 3:
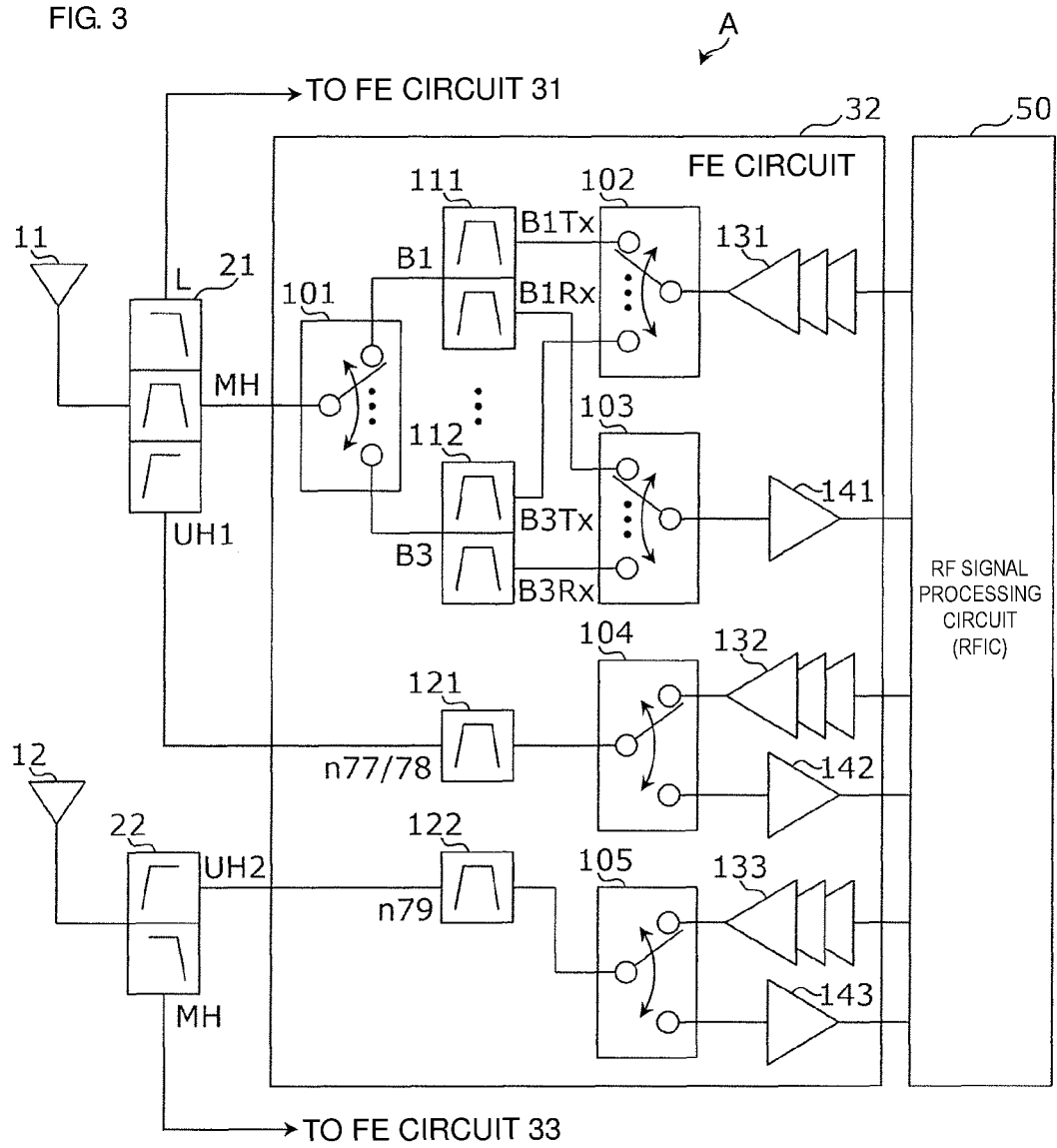
FIG. 3 is a functional block diagram illustrating an exemplary configuration of a front-end circuit according to a preferred embodiment of the present invention.

FIG. 3 is a functional block diagram illustrating an exemplary configuration of the FE circuit 32. FIG. 3 illustrates, together with the internal configuration of the FE circuit 32, the configuration of a portion A bounded by a dashed line in FIG. 1. As illustrated in FIG. 3, the FE circuit 32 includes switches 101 to 105, duplexers 111 and 112, filters 121 and 122, power amplifiers 131 to 133, and low noise amplifiers 141 to 143.

The switches 101, 102, and 103, the duplexers 111 and 112, the power amplifier 131, and the low noise amplifier 141 perform a process including amplification and transmit-receive isolation to a signal in a communication band included in a frequency band MH (e.g., LTE bands B1 and B3).

The filter 121, the switch 104, the power amplifier 132, and the low noise amplifier 142 perform a process including matching, amplification, and transmit-receive isolation to a signal in a communication band included in a frequency band UH1 (e.g., NR bands n77 and n78).

The filter 122, the switch 105, the power amplifier 133, and the low noise amplifier 143 perform a process including matching, amplification, and transmit-receive isolation to a signal in a communication band included in a frequency band UH2 (e.g., NR band n79).

All of the filters in FIG. 3 are preferably LC filters, for example. Each filter is preferably, for example, a chip component including a low temperature co-fired ceramics (LTCC) multilayer body or a circuit embedded in an LTCC multilayer substrate (to be generically referred to as LTCC technology hereinafter).

Figure 4:
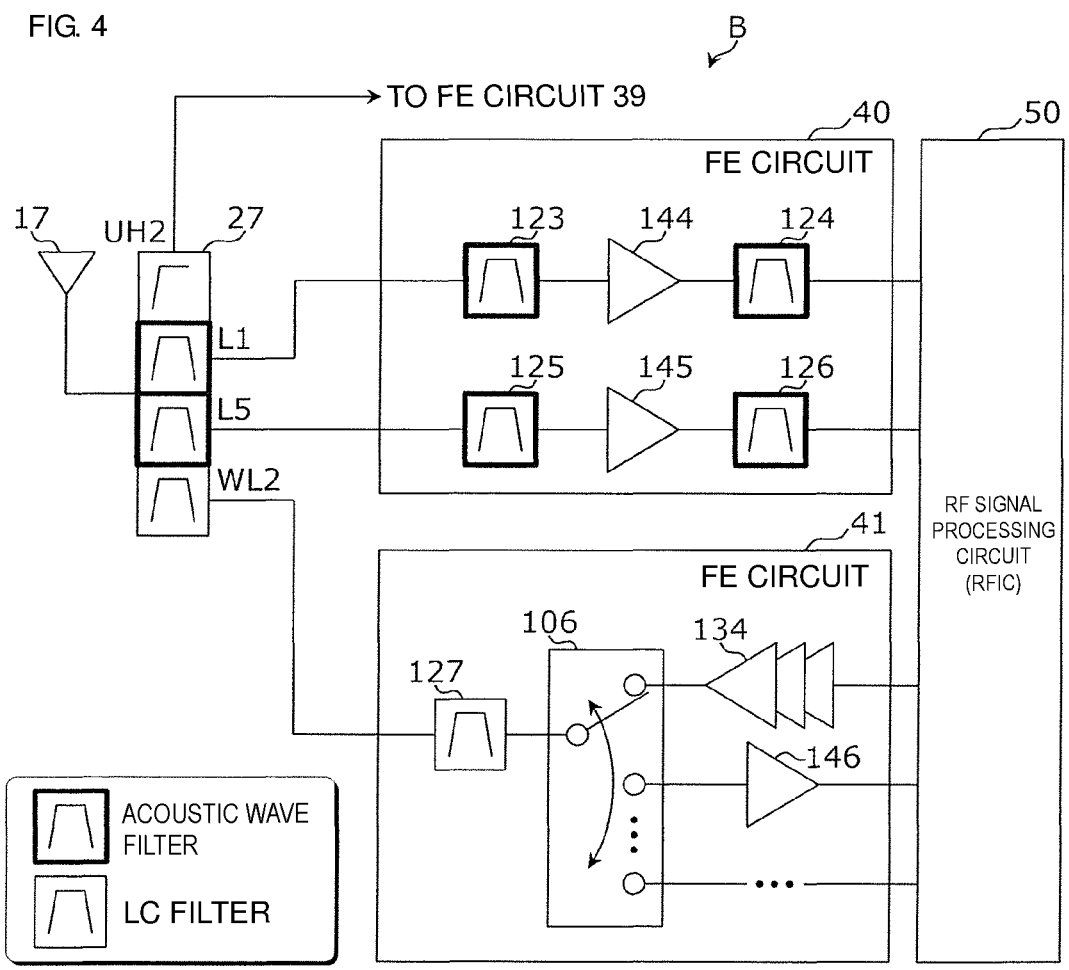
FIG. 4 is a functional block diagram illustrating an exemplary configuration of front-end circuits according to a preferred embodiment of the present invention.

FIG. 4 is a functional block diagram illustrating an exemplary configuration of each of the FE circuits 40 and 41. FIG. 4 illustrates, together with the internal configuration of each of the FE circuits 40 and 41, the configuration of a portion B illustrated in FIG. 1. As illustrated in FIG. 4, the FE circuit 40 includes filters 123 to 126, and low noise amplifiers 144 and 145. The FE circuit 41 includes a filter 127, a switch 106, a power amplifier 134, and a low noise amplifier 146.

In the FE circuit 40, the filters 123 and 124, and the low noise amplifier 144 perform a process including matching and amplification to a signal in the GPS band L1 or in the GLONASS band L1. The filters 125 and 126, and the low noise amplifier 145 perform a process including matching and amplification to a signal in the GPS band L5.

In the FE circuit 41, the filter 127, the switch 106, the power amplifier 134, and the low noise amplifier 146 perform a process including matching, amplification, and transmit-receive isolation to a signal in the wireless LAN 2.4 GHz band. In the FE circuit 41, for example, a signal in the Bluetooth (registered trademark) band may be further processed in a signal path (not illustrated in FIG. 4).

Among the filters in FIG. 4, filters L1 and L5 of the multiplexer 27, and the filters 123 to 126 in the FE circuit 40 are preferably acoustic wave filters (including surface acoustic wave filters and bulk acoustic wave filters), for example. Other filters are preferably LC filters made using LTCC technology, for example.

Advantageous effects provided by the radio-frequency circuit 1 configured as described above will be described below from the viewpoint of the combination of frequency bands sharing each antenna.

Referring to FIG. 2 again, the frequency bands UH1 and UH2 are both higher than or equal to about 3 GHz and do not overlap each other. The lower one of the lower-bound frequency of the frequency band UH1 and the lower-bound frequency of the frequency band UH2 is defined as a given frequency that lies between the upper and lower bounds of the frequency band UH1 or between the upper and lower bounds of the frequency band UH2. For example, if the frequency band UH1 ranges from about 3300 MHz to about 4200 MHz, the lower-bound frequency of the frequency band UH1 is preferably about 3300 MHz, for example. If the frequency band UH2 ranges from about 4400 MHz to about 4990 MHz, the lower bound frequency of the frequency band UH2 is preferably about 4400 MHz, for example. In this case, the lower one of the respective lower-bound frequencies of the frequency bands UH1 and UH2 is preferably 3300 MHz, for example. The spacing between the frequency bands UH1 and UH2 is preferably about 200 MHz, which is less than or equal to about 10% (about 330 MHz) of the lower one, about 3300 MHz, of the respective lower-bound frequencies of the frequency bands UH1 and UH2.

In this regard, the frequency band UH1 and the frequency band UH2 respectively represent an example of a first frequency band and an example of a second frequency band.

Since both of the frequency bands UH1 and UH2 are higher than or equal to about 3 GHz, it is not possible to achieve isolation between a signal in the frequency band UH1 and a signal in the frequency band UH2 using an acoustic wave filter. The narrow spacing between the frequency bands UH1 and UH2 (which is less than or equal to about 10% of the lower one of the respective lower-bound frequencies of the frequency bands UH1 and UH2) means that it is also difficult to achieve isolation between a signal in the frequency band UH1 and a signal in the frequency band UH2 using an LC filter, which has less sharp characteristics than an acoustic wave filter.

Accordingly, as illustrated in FIG. 1, the radio-frequency circuit 1 is provided with the antennas 11 to 18, and a signal in the frequency band UH1 is processed by the antenna 11, 14, 15, or 18 and a signal in the frequency band UH2 is processed by the antenna 12, 13, 16, or 17. That is, isolation between a signal in the frequency band UH1 and a signal in the frequency band UH2, which is difficult to achieve by an acoustic wave filter or by an LC filter, is achieved using separate antennas for these signals. In the present preferred embodiment, the antennas 11, 14, 15, and 18 each represent an example of a first antenna, and the antennas 12, 13, 16, and 17 each represent an example of a second antenna.

At the same time, the antenna 11, 14, 15, or 18 is shared between the frequency band UH1 and the frequency band UH1, L, or WL5, and the antenna 12, 13, 16, or 17 is shared between the frequency band UH2 and the frequency band MH, L1, L5, or WL2. That is, rather than combining the frequency bands UH1 and UH2, the antennas 11 to 18 are each shared by a combination of different frequency bands into which a signal is able to be isolated by the corresponding one of the multiplexers 21 to 28. This configuration reduces or minimizes an increase in the number of antennas resulting from an increase in the number of frequency bands. In this regard, an increase in the number of antennas leads to degradation of isolation between signals transmitted in a plurality of frequency bands. Accordingly, reducing or minimizing an increase in the number of antennas makes it possible to provide isolation between signals transmitted in a plurality of frequency bands.

The above-described configuration provides the radio-frequency circuit 1 for multiband communication in a plurality of frequency bands higher than or equal to about 3 GHz, and makes it possible to reduce or minimize an increase in the number of antennas while providing isolation between signals transmitted in a plurality of frequency bands.

The above-described advantageous effects are also obtained for a portion of the radio-frequency circuit 1 that includes one of the antennas 11, 14, 15, and 18 and one of the antennas 12, 13, 16, and 17. In other words, the above-described advantageous effect is also obtained for a radio-frequency circuit including a single first antenna and a single second antenna.

Now, directing attention to, for example, the portion of the radio-frequency circuit 1 that includes the antennas 11 and 17, isolation between a signal in the frequency band UH1 and a signal in the frequency band UH2 is achieved using separate antennas 11 and 17 for these signals. Further, the antenna 11 is shared by the frequency bands UH1, L, and MH that are able to be isolated from each other by the multiplexer 21, and the antenna 17 is shared by the frequency bands UH2, L1, L5, and WL2 that are able to be isolated from each other by the multiplexer 27. Consequently, seven frequency bands are transmitted and received by two antennas, thus reducing or minimizing an increase in the number of antennas resulting from an increase in the number of frequency bands.

As described above, the radio-frequency circuit 1 includes four antennas each corresponding to a first antenna and four antennas each corresponding to a second antenna. This configuration enables use of various techniques to improve communication performance using a plurality of antennas. Examples of such techniques include carrier aggregation (CA), which is a technique that improves channel width, dual connectivity (DC), which is a technique that enables communication between different base stations, and multiple input multiple output (MIMO), which is a technique that improves data rate by using a plurality of antennas.

With the radio-frequency circuit 1, the following advantageous effects are obtained in accordance with the combination of frequency bands sharing each antenna. For convenience, in the following description, each filter included in a multiplexer will be referred to by the same symbol representing the frequency band included in the pass band of the filter.

According to a first example of a preferred embodiment of the present invention, the multiplexer 21 includes filters L, MH, and UH1, and the multiplexer 23 includes filters UH2 and WL2. Accordingly, the antenna 11 is shared by frequency bands L, MH, and UH1, and the antenna 13 is shared by frequency bands UH2 and WL2.

The frequency bands L, WL2, UH1, and UH2 are arranged in this order from lower to higher frequencies. That is, the frequency band L, which shares the antenna 11 together with the frequency band UH1, is lower than the frequency band WL2, which shares the antenna 13 together with the frequency band UH2. In other words, in the radio-frequency circuit 1, the antenna 11 is shared between the frequency band UH1, which is the lower one of the two frequency bands UH1 and UH2, and the frequency band L, which is the lower one of the two frequency bands L and WL2, and the antenna 13 is shared between the frequency band UH2, which is the higher one of the two frequency bands UH1 and UH2, and the frequency band WL2, which is the higher one of the two frequency bands L and WL2.

In the first example, the antenna 11 and the antenna 13 respectively represent an example of a first antenna and an example of a second antenna, and the frequency band UH1, the frequency band UH2, the frequency band L, and the frequency band WL2 respectively represent an example of a first frequency band, an example of a second frequency band, an example of a third frequency band, and an example of a fourth frequency band. Further, the filter UH1 and the filter L of the multiplexer 21 respectively represent an example of a first filter and an example of a third filter, and the filter UH2 and the filter WL2 of the multiplexer 23 respectively represent an example of a second filter and an example of a fourth filter.

That is, when the antennas 11 and 13 are respectively regarded as the first and second antennas, the following structural features are preferably provided: the pass band of the third filter a third frequency band lower than the first frequency band, the pass band of the fourth filter includes a fourth frequency lower than the second frequency, the first frequency band is lower than the second frequency band, and the third frequency band is lower than the fourth frequency band.

For comparison, a case is considered in which the combinations of frequency bands are changed from those according to the first example, such that the antenna 11 is shared by the frequency bands UH1 and WL2, and the antenna 13 is shared by the frequency bands UH2 and L. In this case, the spacing between the frequency bands transmitted and received by the antenna 11 decreases, and the total width of the frequency bands transmitted and received by the antenna 13 increases. This makes it difficult to achieve isolation between signals transmitted and received by the antenna 11. Further, the antenna 13 is required to have a wide frequency coverage.

By contrast, with the combinations according to the first example, the spacing of the frequency bands transmitted and received by the antenna 11 and the spacing of the frequency bands transmitted and received by the antenna 13 are more even between each other, and the total width of the frequency bands transmitted and received by the antenna 11 and the total width of the frequency bands transmitted and received by the antenna 13 are more even between each other. This improves or optimizes signal isolation and frequency coverage for both of the antennas 11 and 13. This advantageous effect is obtained not only for the above-described example with the antennas 11 and 13, but also for any two antennas by combining frequency bands sharing each of the two antennas as appropriate while taking their arrangement in frequency order into consideration.

In another preferred configuration, the antenna 11 and the antenna 12 respectively represent an example of a first antenna and an example of a second antenna, and the frequency band UH1, the frequency band UH2, the frequency band L, and the frequency band MH respectively represent an example of a first frequency band, an example of a second frequency band, an example of a third frequency band, and an example of a fourth frequency band. In another possible configuration, the filter UH1 and the filter L of the multiplexer 21 respectively represent an example of a first filter and an example of a third filter, and the filter UH2 and the filter MH of the multiplexer 23 respectively represent an example of a second filter and an example of a fourth filter.

According to a second example of a preferred embodiment of the present invention, the multiplexer 24 includes filters UH1 and WL5. Thus, the antenna 14 is shared by frequency bands UH1 and WL5. That is, the antenna 14 is shared by the combination of the frequency band WL5 and the frequency band UH1, which is one of the two frequency bands UH1 and UH2 with the greater spacing from the frequency band WL5.

In the second example, the antenna 14 represents an example of a first antenna, and the frequency band UH1, the frequency band UH2, and the frequency band WL5 respectively represent an example of a first frequency band, an example of a second frequency band, and an example of a third frequency band. The filter WL5 of the multiplexer 24 represents an example of a third filter.

That is, when the antenna 14 is regarded as the first antenna, the following features are preferably provided: the pass band of the third filter includes a third frequency band, and the spacing between the first frequency band and the third frequency band is greater than the spacing between the second frequency band and the third frequency band.

As described above, the combination according to the second example provides increased spacing between the frequency bands to be isolated from each other, in comparison with the combination of the frequency bands UH2 and WL5 with a comparatively narrower spacing therebetween. The above-described advantageous effects are obtained not only for the antenna 14, but also for any antenna by sharing the antenna by a combination of frequency bands with a comparatively wider spacing from each other.

As described above, in the radio-frequency circuit 1, an antenna is shared by a combination of frequency bands whose spacing is not excessively narrow. Consequently, by using a combination of frequency bands that are spaced widely enough for these frequency bands to be isolated from each other using an LC filter, a multiplexer is able to be provided by using an LC filter, which is lower in loss and cost than an acoustic wave filter (see, for example, FIG. 3).

In the case of combining frequency bands that are so narrowly spaced that isolating the frequency bands from each other by an LC filter results in increased loss, a multiplexer may be defined by using an acoustic wave filter (see, for example, FIG. 4). Using an acoustic wave filter makes it possible to achieve isolation between frequency bands that are more widely spaced than the frequency bands that are able to be isolated from each other using an LC filter.

If an acoustic wave filter is used for a multiplexer, a filter within an FE circuit connected to the acoustic wave filter may be also defined by an acoustic wave filter (e.g., the filters 123 to 126 in FIG. 4). In this case, the acoustic wave filter in the multiplexer may also be defined and function as an acoustic wave filter included in an FE circuit directly connected to the acoustic wave filter, thus making it possible to reduce the number of circuit elements (components). For example, in the example illustrated in FIG. 4, the filters 123 and 125 may be omitted.

According to a preferred embodiment of the present invention, a radio-frequency circuit is provided for multi-band wireless communication in a plurality of frequency bands, the plurality of frequency bands including a first frequency band and a second frequency band, the first frequency band and the second frequency band being both higher than or equal to about 3 GHz and non-overlapping with each other, the first frequency band and the second frequency band having a spacing from each other less than or equal to about 10% of the lower one of the lower-bound frequency of the first frequency band and the lower-bound frequency of the second frequency band. The radio-frequency circuit includes a first antenna, a second antenna, a first multiplexer connected to the first antenna, and a second multiplexer connected to the second antenna. The first multiplexer includes a first filter having a pass band that includes the first frequency band, and a third filter having a pass band different from the pass band of the first filter. The second multiplexer includes a second filter having a pass band that includes the second frequency band, and a fourth filter having a pass band different from the pass band of the second filter.

According to the above-described configuration, the first frequency band and the second frequency band are both higher than or equal to about 3 GHz. Therefore, it is not possible to isolate a signal in the first frequency band and a signal in the second frequency band from each other using an acoustic wave filter. Further, the first frequency band and the second frequency band have a narrow spacing from each other that is less than or equal to about 10% of the lower one of the lower-bound frequency of the first frequency band and the lower-bound frequency of the second frequency band. This makes it also difficult to isolate a signal in the first frequency band and a signal in the second frequency band from each other using an LC filter, which has less sharp characteristics than an acoustic wave filter. Consequently, if the first frequency band and the second frequency band are both higher than or equal to about 3 GHz, and their spacing is less than or equal to about 10% of the lower one of the lower-bound frequency of the first frequency band and the lower-bound frequency of the second frequency band, an antenna is required for each corresponding frequency band. This requirement, together with the number of antennas through which signals in existing frequency bands lower than or equal to about 3 GHz pass, leads to an increase in the number of antennas, and also a degradation of isolation between signals transmitted in a plurality of frequency bands.

Accordingly, the radio-frequency circuit is provided with the first antenna and the second antenna, and a signal in the first frequency band is transmitted and received by the first antenna and a signal in the second frequency band is transmitted and received by the second antenna. That is, isolation between a signal in the first frequency band and a signal in the second frequency band, which is difficult to achieve by an acoustic wave filter or by an LC filter, is achieved using separate antennas for these signals.

Further, the first antenna is shared by the first frequency band and the third frequency band, and the second antenna is shared by the second frequency band and the fourth frequency band. That is, rather than combining the first and second frequency bands, each antenna is shared by a combination of different frequency bands into which a signal is able to be isolated by the corresponding multiplexer. This configuration reduces or minimizes an increase in the number of antennas resulting from an increase in the number of frequency bands.

The above-described configuration provides a radio-frequency circuit for multiband communication in a plurality of frequency bands higher than or equal to about 3 GHz, and makes it possible to reduce or minimize an increase in the number of antennas while providing isolation between signals transmitted in a plurality of frequency bands.

In another configuration, the first frequency band preferably ranges from about 3300 MHz to about 4200 MHz, and the second frequency band preferably ranges from about 4400 MHz to about 4990 MHz, for example.

The above-described configuration provides a radio-frequency circuit applied to the NR sub-6 GHz bands that are being developed by the 3GPP.

In another preferred configuration, the pass band of the third filter includes a third frequency band lower than the first frequency band, the pass band of the fourth filter includes a fourth frequency lower than the second frequency, the first frequency band is lower than the second frequency band, and the third frequency band is lower than the fourth frequency band.

According to the above-described configuration, the lower one of the first and second frequency bands, and the lower one of the third and fourth frequency bands share the first antenna, and the higher one of the first and second frequency bands and the higher one of the third and fourth frequency bands share the second band.

For comparison, a case is considered in which the combinations of frequency bands are changed from those described above such that the first antenna is shared by the first frequency band and the fourth frequency band, and the second antenna is shared by the second frequency band and the third frequency band. In this case, the spacing between the frequency bands transmitted and received by the first antenna decreases, and the total width of the frequency bands transmitted and received by the second antenna increases. This makes it difficult to achieve isolation between signals transmitted and received by the first antenna. Further, the second antenna is required to have a wide frequency coverage.

In contrast, with the above-described combinations, the spacing between the frequency bands transmitted and received by the first antenna and the spacing between the frequency bands transmitted and received by the second antenna are more even between each other, and the total width of the frequency bands transmitted and received by the first antenna and the total width of the frequency bands transmitted and received by the second antenna are more even between each other. This improves or optimizes signal isolation and frequency coverage for both of the first and second antennas.

In another preferred configuration, the third frequency band preferably ranges from about 617 MHz to about 960 MHz, and the fourth frequency band preferably ranges from about 2400 MHz to about 2500 MHz, for example.

In another preferred configuration, the third frequency band preferably ranges from about 617 MHz to about 960 MHz, and the fourth frequency band preferably ranges from about 1427 MHz to about 2690 MHz, for example.

The above-described configuration provides a radio-frequency circuit applied to bands below about 1 GHz, which are typically represented by bands, such as the GSM (registered trademark) low bands and the LTE B8 band, and to the wireless LAN 2.4 GHz band, for example.

In another preferred configuration, the pass band of the third filter includes a third frequency band, and the spacing between the first frequency band and the third frequency band is greater than the spacing between the second frequency band and the third frequency band.

According to the above-described configuration, the first antenna is shared by the combination of the third frequency band and the first frequency band, which is one of the first and second frequency bands with the greater spacing from the third frequency band. This results in increased spacing between frequency bands in comparison with the combination of the second and third frequency bands with a comparatively narrower spacing therebetween, thus facilitating signal isolation.

In another preferred configuration, the third frequency band preferably ranges from about 5150 MHz to about 5950 MHz, for example.

The above-described configuration provides a radio-frequency circuit applied to, specifically, the wireless LAN 5 GHz band and the LTE B46 band.

In another preferred configuration, the pass band of the fourth filter includes a fourth frequency band, the fourth frequency band has an upper-bound frequency below about 3 GHz, and the fourth filter is defined by an acoustic wave filter.

According to the above-described configuration, the fourth filter is defined by an acoustic wave filter. Consequently, for example, the fourth filter is also able to be used as an acoustic wave filter included in another circuit connected to the fourth filter, thus reducing the total number of components for the radio-frequency circuit.

In another preferred configuration, the fourth frequency band preferably ranges from about 1166 MHz to about 1229 MHz or/and from about 1559 MHz to about 1606 MHz, for example.

The above-described configuration provides a radio-frequency circuit applied to, specifically, satellite positioning systems such as Global Positioning System (GPS) and Global Navigation Satellite System (GLONASS).

In another preferred configuration, the radio-frequency circuit further includes a front-end circuit connected to at least one of the first multiplexer and the second multiplexer to perform a process to an antenna signal from the at least one of the first antenna and the second antenna, the process including at least one of matching, amplification, and transmit-receive isolation.

In another preferred configuration, the radio-frequency circuit further includes a radio-frequency signal processing circuit connected to the front-end circuit to perform a process to the antenna signal, the process including at least one of modulation and demodulation.

The above-described configurations provide a high-functionality radio-frequency circuit integrating a front-end circuit and a radio-frequency signal processing circuit.

Although the radio-frequency circuits according to the above-described preferred embodiments of the present invention have been described, the present invention is not limited to the individual preferred embodiments described above. It is to be noted that various modifications to the preferred embodiments as may be apparent to those skilled in the art, and combinations of features or components from different preferred embodiments may fall within the scope of one or more aspects of the present invention, provided that such modifications and combinations do not depart from the scope and sprit of the present invention.

Preferred embodiments of the present invention may be used for a wide variety of mobile terminal apparatuses, such as cellular phones, for example, as a radio-frequency circuit for multiband wireless communication in a plurality of frequency bands higher than or equal to about 3 GHz.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radio-frequency circuit for multiband wireless communication in a plurality of frequency bands, the plurality of frequency bands including a first frequency band and a second frequency band, the first frequency band and the second frequency band both being higher than or equal to about 3 GHz and non-overlapping with each other, the first frequency band and the second frequency band having a spacing from each other less than or equal to about 10% of a lower one of a lower-bound frequency of the first frequency band and a lower-bound frequency of the second frequency band, the radio-frequency circuit comprising:
   a first antenna;
   a second antenna;
   a first multiplexer connected to the first antenna, the first multiplexer including:
      a first filter with a pass band that includes the first frequency band; and
      a third filter with a pass band different from the pass band of the first filter; and
   a second multiplexer connected to the second antenna, the second multiplexer including:
      a second filter with a pass band that includes the second frequency band; and
      a fourth filter with a pass band different from the pass band of the second filter.

2. The radio-frequency circuit according to claim 1, wherein the first frequency band ranges from about 3300 MHz to about 4200 MHz, and the second frequency band ranges from about 4400 MHz to about 4990 MHz.

3. The radio-frequency circuit according to claim 1, wherein
   the pass band of the third filter includes a third frequency band lower than the first frequency band, and the pass band of the fourth filter includes a fourth frequency band lower than the second frequency band; and
   the first frequency band is lower than the second frequency band, and the third frequency band is lower than the fourth frequency band.

4. The radio-frequency circuit according to claim 3, wherein the third frequency band ranges from about 617 MHz to about 960 MHz, and the fourth frequency band ranges from about 2400 MHz to about 2500 MHz.

5. The radio-frequency circuit according to claim 3, wherein the third frequency band ranges from about 617 MHz to about 960 MHz, and the fourth frequency band ranges from about 1427 MHz to about 2690 MHz.

6. The radio-frequency circuit according to claim 1, wherein the pass band of the third filter includes a third frequency band; and a spacing between the first frequency band and the third frequency band is greater than a spacing between the second frequency band and the third frequency band.

7. The radio-frequency circuit according to claim 6, wherein the third frequency band ranges from about 5150 MHz to about 5950 MHz.

8. The radio-frequency circuit according to claim 1, wherein the pass band of the fourth filter includes a fourth frequency band;

the fourth frequency band has an upper-bound frequency below about 3 GHz; and the fourth filter is defined by an acoustic wave filter.

9. The radio-frequency circuit according to claim 8, wherein the fourth frequency band ranges from about 1166 MHz to about 1229 MHz or/and from about 1559 MHz to about 1606 MHz.

10. The radio-frequency circuit according to claim 1, wherein each of the first filter and the second filter is an LC filter.

11. The radio-frequency circuit according to claim 1, further comprising a front-end circuit connected to at least one of the first multiplexer and the second multiplexer to perform a process to an antenna signal from the at least one of the first antenna and the second antenna, the process including at least one of matching, amplification, and transmit-receive isolation.

12. The radio-frequency circuit according to claim 11, further comprising a radio-frequency signal processing circuit connected to the front-end circuit to perform a process to the antenna signal, the process including at least one of modulation and demodulation.

13. The radio-frequency circuit according to claim 12, wherein the radio-frequency signal processing circuit is a radio-frequency integrated circuit.

14. The radio-frequency circuit according to claim 11, wherein the front-end circuit includes switches, duplexers, filters, power amplifiers, and low noise amplifiers.

15. The radio-frequency circuit according to claim 14, wherein the each of the filters of the front-end circuit are LC filters.

16. The radio-frequency circuit according to claim 14, wherein each of the filters of the front-end circuit is a chip component including a low temperature co-fired ceramics multiplayer body.

17. The radio-frequency circuit according to claim 1, wherein the first antenna includes four first antennas, and the second antenna includes four second antennas.

* * * * *